(12) United States Patent
Ostrovsky (10) Patent No.: US 8,364,979 B1
(45) Date of Patent: Jan. 29, 2013

(54) APPARATUS, SYSTEM, AND METHOD TO EFFICIENTLY SEARCH AND MODIFY INFORMATION STORED ON REMOTE SERVERS, WHILE HIDING ACCESS PATTERNS

(75) Inventor: Rafail Ostrovsky, Los Angeles, CA (US)

(73) Assignee: Stealth Software Technologies, Inc., Los Angeles, CA (US)

( * ) Notice: Subject to any disclaimer, the term of this patent is extended or adjusted under 35 U.S.C. 154(b) by 500 days.

(21) Appl. No.: 12/768,617

(22) Filed: Apr. 27, 2010

Related U.S. Application Data (60) Provisional application No. 61/172,836, filed on Apr. 27, 2009.

(51) Int. Cl.
*H04L 29/06* (2006.01)
(52) U.S. Cl. ........ 713/189; 713/190; 713/193; 711/154; 711/170; 711/202
(58) Field of Classification Search .................. 713/190
See application file for complete search history.

(56) References Cited

U.S. PATENT DOCUMENTS

| 5,123,045 | A | 6/1992 | Ostrovsky | |
|---|---|---|---|---|
| 2008/0022102 | A1* | 1/2008 | Venkatesan et al. | 713/173 |
| 2010/0106920 | A1* | 4/2010 | Anckaert et al. | 711/154 |

OTHER PUBLICATIONS

Williams et al, "Building Castles out of Mud: Practical Access Pattern Privacy and Correctness on Untrusted Storage", 2008, pp. 139-148.*

Ajtai et al., "An 0(n log n) Sorting Network", STOC '83: Proceedings of the Fifteenth Annual ACM Symposium on Theory of Computing, pp. 1-9, 1983.
Batcher, "Sorting Networks and Their Applications", In AFIPS Spring Joint Computing Conference, pp. 307-314, 1968.
Ben-Or et al., "Multi-prover Interactive Proofs: How to Remove Intractability Assumptions", STOC '88: Proceedings of the Twentieth Annual ACM Symposium on Theory of Computing, pp. 113-131, 1988.
Bloom, "Space/Time Trade-offs in Hash Coding with Allowable Errors", Commun. ACM, 13(7):422-426, 1970.
Boneh et al., "Public key Encryption that Allows PIR Queries", CRYPTO '07: Proceedings of the 27th Annual International Cryptology Conference on Advances in Cryptology, pp. 50-67, 2007.
Chor et al., "Private Information Retrieval", Proc. of 36th IEEE Conference on the Foundations of Computer Science (FOCS), pp. 41-50, Oct. 1995.
Goldreich, "Towards a Theory of Software Protection and Simulation by Oblivious RAMs", STOC '87: Proceedings of the Nineteenth Annual ACM Symposium on Theory of Computing, pp. 182-194, 1987.

(Continued)

*Primary Examiner* — David Pearson
*Assistant Examiner* — Thaddeus Plecha
(74) *Attorney, Agent, or Firm* — Cooley LLP (57) ABSTRACT instructions to: (1) process first data by encrypting based on a first key and re-arranging based on a first mapping to obtain second data, where a first element included in the first data is associated with a first index corresponding to a location in a first memory; (2) request to store the second data in a second memory at locations determined based on the first mapping; (3) in response to determining that the first element is not stored in the first memory, request a second element from the second memory; and (4) in response to determining that the first element is stored in the first memory: (a) retrieve the first element from the first memory; and (b) request a third element from the second memory that has not been previously requested, without requesting the second element from the second memory.

12 Claims, 6 Drawing Sheets

OTHER PUBLICATIONS

Goodrich, "Randomized Shellsort: A Simple Oblivious Sorting Algorithm", In Proceedings 21st ACM-SIAM Symposium on Discrete Algorithms (SODA), pp. 1262-1277, 2010.

Kirsch et al., "More Robust Hashing: Cuckoo Hashing with a Stash", Proceedings of the 16th Annual European Symposium on Algorithms (ESA), pp. 611-622, 2008.

Ostrovsky, "Efficient Computation on Oblivious RAMs (Extended Abstract)", STOC '90: Proceedings of the Twenty-second Annual ACM Symposium on Theory of Computing, pp. 514-523, 1990.

Ostrovsky, "Private Information Storage (Extended Abstract)", STOC '97: Proceedings of the Twenty-ninth Annual ACM Symposium on Theory of Computing, pp. 294-303, 1997.

Osvik et al., "Cache Attacks and Countermeasures: The Case of AES", CT-RSA '06: Proceedings of the 2006 The Cryptographers' Track at the RSA conference on Topics in Cryptology, pp. 1-20, 2006.

Pagh et al., "Cuckoo Hashing", F. Meyer auf der Heide (Ed.): ESA 2001, LNCS 2161, pp. 121-133, 2001.

Pippenger et al., "Relations Among Complexity Measures", Journal of the Association for Computing Machinery, vol. 26, No. 2, pp. 361-381, Apr. 1979.

Williams et al., "Building Castles out of Mud: Practical Access Pattern Privacy and Correctness on Untrusted Storage", CCS '08, Alexandria, VA, pp. 139-148, Oct. 27-31, 2008.

Williams et al., "Usable PIR", Network and Distributed System Security Symposium (NDSS), 11 pgs., 2008.

Ostrovsky et al. "Private information storage" Proc. 29th ACM Symposium on Theory of Computing (STOC-97) http://www.cs.ucla.edu/~rafail/PUBLIC/28.html.

Pinkas et al. "Oblivious RAM revisited" (2010) http://eprint.iacr.org/2010/366.

Goldreich et al. "Software protection and simulation on oblivious RAMs" J. ACM 43(3): 431-473 (1996).

Ostrovsky. "Software protection and simulation on oblivious RAMs" MIT Ph.D. Thesis, Computer Science (May 1992).

Wikipedia. "Advanced Encryption Standard" http://en.wikipedia.org/wiki/Advanced_Encryption_Standard.

Goldreich et al. "How to construct random functions" J. ACM (JACM) 33:4 (Oct. 1986) pp. 792-807.

Wikipedia. "Message Authentication Code (MAC)" http://en.wikipedia.org/wiki/Message_authentication_code.

Blum et al. "Checking the correctness of memories" J. Algorithmica 12: 2-3 (Sep. 1994) pp. 225-244.

Dwork et al. "How efficient can memory checking be?" Book Series Lecture Notes in Computer Science Springer. vol. 5444/2009,Theory of Cryptography (2009).

Papamanthou et al. "Authenticated hash tables" ACM Conf on Computer and Communications Security (2008) 437-448.

Wikipedia. "Digital Signature." http://en.wikipedia.org/wiki/Digital_signature.

Goldwasser et al. "A digital signature scheme secure against adaptive chosen-message attacks" SIAM J. Computing, 17(2):281-308 (Apr 1988).

Wikipedia. "Cache" http://en.wikipedia.org/wiki/Cache.

Wikipedia. "Private Information Retrieval" http://en.wikipedia.org/wiki/Private_information_retrieval.

Ostrovsky et al. "A survey of single-database PIR: techniques and applications" Proc. Public Key Cryptography 2007 Conf. pp. 393-411. (PKC-2007).

Curtmola et al. "Searchable symmetric encryption: improved definitions and efficient constructions" Proc. 13th ACM Conf. on Computer and Communications Security (CCS 2006).

* cited by examiner

FIG. 6

APPARATUS, SYSTEM, AND METHOD TO EFFICIENTLY SEARCH AND MODIFY INFORMATION STORED ON REMOTE SERVERS, WHILE HIDING ACCESS PATTERNS

CROSS REFERENCE TO RELATED APPLICATION

The present application claims the benefit of commonly owned U.S. Provisional Patent Application No. 61/172,836, entitled "Apparatus, System, and Method to Efficiently Search and Modify Information Stored on Two or More Servers, While Hiding Information Including Access Pattern Information From the Servers," filed on Apr. 27, 2009, which is incorporated herein by reference in its entirety.

FIELD OF THE INVENTION

The invention generally relates to data processing in computer networks. More particularly, the invention relates to an apparatus, system, and method to efficiently search and modify information stored on remote servers, while hiding information including the access pattern from the servers.

BACKGROUND

Computer users, including individuals as well as organizations, often require the capability to backup their confidential and/or proprietary data. There are many business needs for these backup capabilities. For example, backups are needed to ensure that data is not lost even if computers that hold data were to become infected with a computer virus or a worm that destroys data, or if hard drives that hold data were to fail, or if computers that hold data were to be destroyed or stolen. Thus, there is a significant need for computer users to perform frequent backups of important, confidential data. Some examples of important, confidential data include medical case histories, information associated with legal representations, and financial information.

In recent years, backup services have been offered to clients by storage providers over the Internet. These services are typically based on the following model: encryption of data locally on the client's computer, then transfer of the encrypted data over the Internet to the provider for backup. The provider may have a large server farm to take advantage of economies of scale that may result from reduced cost of storage on a large scale, and from amortized operational costs (such as costs of security, electricity, rent, and maintenance). The provider may therefore be able to offer backup services to clients at a significant savings compared to the cost that would be incurred by clients were they to perform their own data backup.

To attain these cost savings, clients provide their confidential data to third-party providers, which raises the issue of the safety of the client data while in the provider's possession. Providers may claim that due to their internal policies and procedures, client data uploaded to their server farms cannot be accessed by other clients and cannot be used by provider employees for any illegitimate purpose. Providers may also point to the encryption of client data (such as filenames and file contents), where the provider does not know the decryption key, as making the client data undecipherable to the provider, and to the use of approaches such as message authentication codes as protecting against tampering with the client data.

However, even if client filenames and file contents are encrypted, important information can still be revealed to any party with access to a provider's servers in the form of statistics associated with a client's data access pattern. For example, an employee of the provider could observe variations in the number of encrypted data blocks (such as files or database records) retrieved by a client per time interval (such as per day or per hour). The employee of the provider could also observe the frequency with which any individual encrypted data block is accessed by the client, and learn over time how different frequencies of use correlate with this client's externally observable behavior. The employee of the provider could provide this information to another party that could use this information to predict real-world actions to be taken by the client in the future. For example, the data access pattern of a small company could signal whether a product under development is nearing final release, and the data access pattern of a small law firm could signal when documents in a case are being reviewed just prior to filing.

It is against this background that a need arose to develop the apparatus, system, and method described herein.

SUMMARY

One aspect of the invention relates to a computer readable storage medium. In one embodiment, the computer readable storage medium includes executable instructions to: (1) process a first plurality of data elements such that the first plurality of data elements are encrypted based on a first key and re-arranged based on a first mapping to obtain a second plurality of data elements, where a first data element included in the first plurality of data elements is encrypted based on the first key to obtain a second data element included in the second plurality of data elements, and where the first data element is associated with a first index corresponding to a location in a first memory; (2) request to store the second plurality of data elements in a second memory at locations determined based on the first mapping, where the second data element is associated with a second index corresponding to a location in a second memory, where the second index is obtained from the first index based on the first mapping; (3) determine whether the first data element is stored in the first memory; (4) in response to determining that the first data element is not stored in the first memory: (a) request the second data element from the second memory based on the second index; (b) decrypt the second data element to obtain the first data element based on the first key; and (c) store the first data element at the location in the first memory; and (5) in response to determining that the first data element is stored in the first memory: (a) retrieve the first data element from the first memory; and (b) request a third data element from the second memory that has not been previously requested, without requesting the second data element from the second memory.

In another embodiment, the computer readable storage medium includes executable instructions to: (1) receive a first plurality of data elements from a first computer; (2) process the first plurality of data elements such that the first plurality of data elements are encrypted based on a first key and re-arranged based on a first mapping to obtain a second plurality of data elements; (3) request to store the second plurality of data elements in a first memory at locations determined based on the first mapping, wherein the first memory is accessible by a second computer; and (4) provide the first key and the first mapping to the first computer to allow decoding of the second plurality of data elements by the first computer; (5) where the first key and the first mapping are unavailable to the second computer.

BRIEF DESCRIPTION OF THE DRAWINGS

For a better understanding of the nature and objects of some embodiments of the invention, reference should be made to the following detailed description taken in conjunction with the accompanying drawings. In the drawings, like reference numbers denote like elements, unless the context clearly dictates otherwise.

DETAILED DESCRIPTION

One goal of embodiments of the invention is to enable a client's data access pattern to be hidden from servers, both in embodiments in which a client interacts with a single server, and in embodiments in which a client interacts with multiple servers. To achieve this, embodiments of the invention need not rely on sorting networks to reshuffle data, which are computationally expensive. Instead, embodiments of the invention make the client's data access pattern appear random to servers by encrypting and re-arranging client data stored on one or more servers, and by performing data accesses so that each client data access (or data access of client data by a server on behalf of a client) is of a data element that has not previously been accessed, i.e. each data element accessed by a client, or by a server on behalf of a client, is accessed no more than once from the same logical location on the server. Embodiments of the invention also replace the client data stored on the one or more servers with client data that has been encrypted using one or more different keys, and that has been re-arranged using a different mapping, where the keys and the mapping can be varied so that the re-arranged and re-encrypted client data appears randomly changed relative to the client data previously stored on the one or more servers. Embodiments of the invention replace the client data sufficiently often so that each data element accessed by a client from the same location, or by a server on behalf of a client from the same location, is accessed no more than once in between each re-arrangement and re-encryption of the data elements.

It is contemplated that embodiments of the invention can be used to hide data access patterns for any type of data that can be stored, for example, on a hard drive. This data can be in the form of a table, an array, or another form of structured data. This data should be broken into data elements of the same size. For example, an unstructured data file can be divided into multiple data elements of the same size, and may be padded so that every data element is of the same size.

Figure 1:
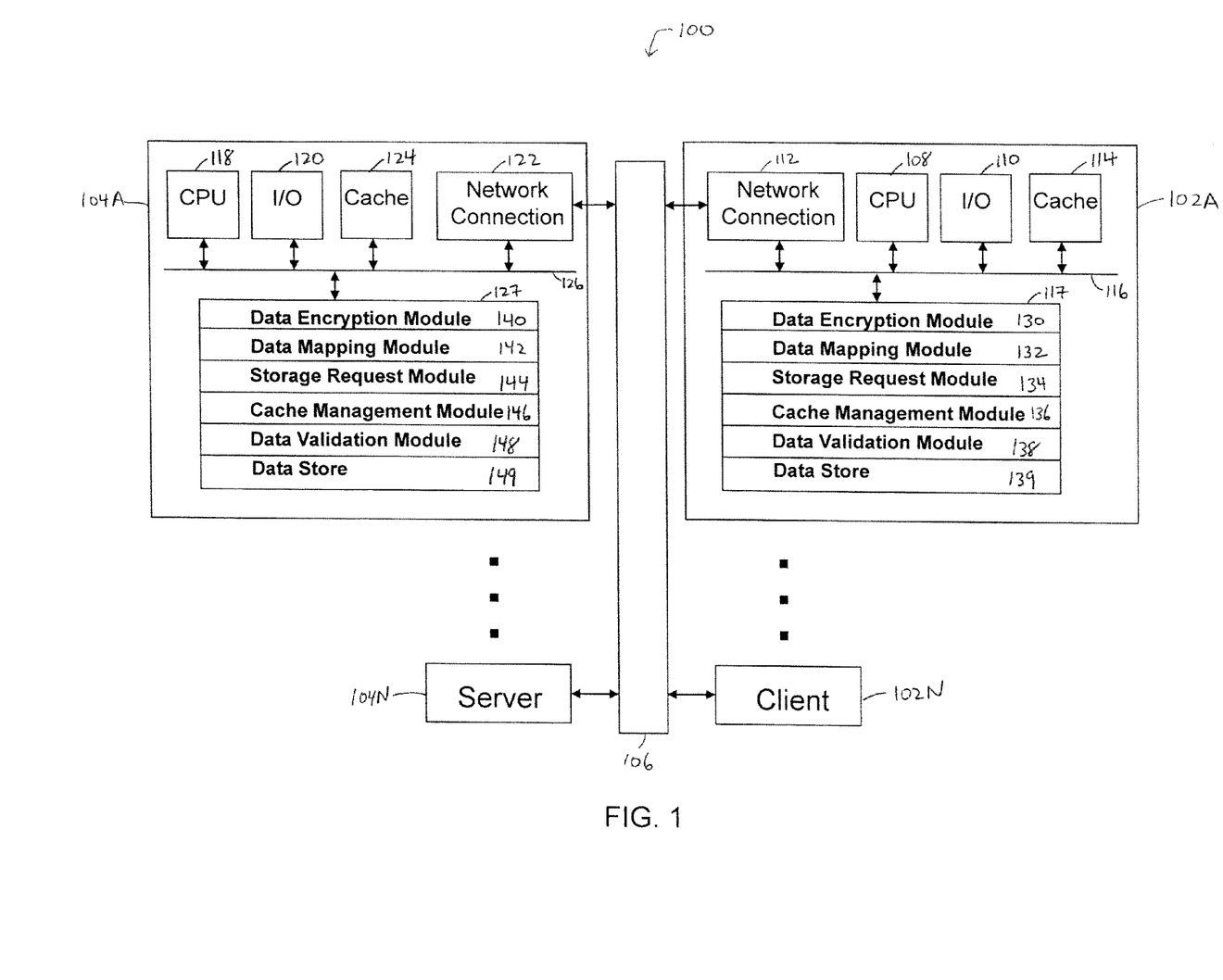
FIG. 1 illustrates a system for efficiently searching and modifying information stored on remote servers, while hiding access patterns, in accordance with embodiments of the present invention.

FIG. 1 illustrates a system 100 for efficiently searching and modifying information stored on remote servers, while hiding access patterns, in accordance with embodiments of the present invention. The system 100 includes a transmission channel 106 connecting a client computers 102A-102N with server computers 104A-104N. The transmission channel 106 may represent a network, such as a packet-switched network (such as the Internet) or a circuit-switched network. Each client computer 102 includes standard components, such as a network connection 112, a CPU 108, and an input/output devices 110, which communicate over a bus 116. Each client computer 102 also includes a cache 114. The cache 114 may be managed by hardware and/or software. The memory 117 stores a set of executable programs that are used to implement functions of embodiments of the invention. Similarly, each server computer 104 includes standard components, such as a network connection 122, a CPU 118, and an input/output devices 120, which communicate over a bus 126. Each server 104 also may include a cache 124. The caches 114 and 124 may be managed by hardware and/or software. The memory 127 stores a set of executable programs that are used to implement functions of embodiments of the invention.

In an embodiment of the invention, the memory 117 includes executable instructions establishing the various modules of the client 102 shown in FIG. 1. The data encryption module 130 encrypts client data using a private key. The data encryption module 130 also decrypts encrypted client data received from the server 104 with the private key. The data mapping module 132 re-arranges client data. The data mapping module 132 also reverses the mapping to decode mapped client data received from the server 104.

The data request module 134 requests to store encrypted and re-arranged client data in a memory at the server 104, where the memory may be a cache memory and/or another type of writable memory. The data request module 134 also requests encrypted and re-arranged client data from the server 104. The cache management module 136 manages data entering and exiting the cache 114. For example, the cache management module 136 may determine whether a data element is stored in the cache 114, and may also store a data element that has been decoded by the data encryption module 130 and the data mapping module 132 in the cache 114. In certain embodiments, the data validation module 138 validates data elements that have been decoded by the data encryption module 130 and the data mapping module 132. The data store module 139 may read data from and write data to the memory 117. For example, the data store module 139 may read original client data to be backed up on the server 104 from the memory 117.

In an embodiment of the invention, the memory 127 includes executable instructions establishing the various modules of the server 104 shown in FIG. 1. In embodiments of the invention involving a single server, the memory 127 may include only the data store module 149, which may read data from and write data to the memory 127. For example, the data store module 149 may write backup data from the client 102 to the memory 127, and may read backup data from the memory 127 to be provided to the client 102. The memory 127 may also include the cache management module 146, if backup data to/from the client 102 is stored in the cache 124.

In embodiments of the invention involving multiple servers 104, the memory 127 may include the data store module 149 and the cache management module 146, and may also include the data encryption module 140, the data mapping module 142, the data request module 146, and the data validation module 148. In multiple-server embodiments, a server 104A may encrypt (module 140) and re-arrange (module 142) data stored on the server 104A that is associated with the client 102, and request storage (module 146) of the encrypted and re-arranged data on another server 104B. Similarly, the server 104A may decrypt (module 140) and re-arrange (module 142) data received from the server 104B that is associated with the client 102 to obtain the data prior to storage on the server 104B, and may validate (module 148) data elements that have been decoded by the data encryption module 140 and the data mapping module 142. Modules performing the same functions may also reside on one or more of servers 104B-104N.

The modules in memories 117 and 127 are exemplary. The function of individual modules may be combined. In addition, the modules associated with a client 102 may reside on a single computer 102A, or may be distributed across a network. Similarly, the modules associated with a server 104 may reside on a single computer 104A, or may be distributed across a network.

Figure 2:
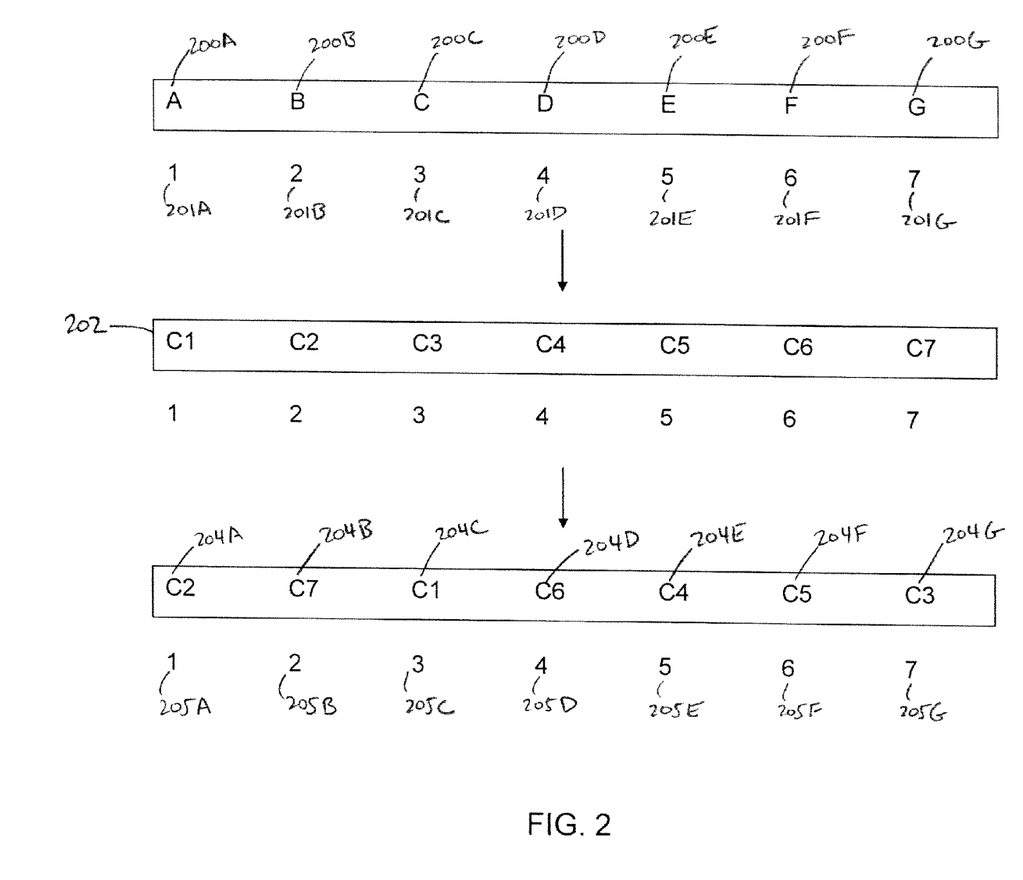
FIG. 2 illustrates operations associated with encrypting and re-arranging data elements, in accordance with embodiments of the present invention.

FIG. 2 illustrates operations associated with encrypting and re-arranging data elements 200, in accordance with embodiments of the present invention. In this example, the original client data 200 to be backed up is in the form of seven data elements 200A-200G having the values A-G, respectively, where each of the seven data elements 200A-200G is of the same size. Here, the number of elements is seven for illustrative purposes only, and can be any other number. That is, there may be an arbitrary number of data elements, each of equal size, so long as both the number and the size are known in advance.

Each of the data elements 200A-200G is associated with a corresponding index 201A-201G, respectively. The index can be a computer memory, or an index of an array in a computer programming language or a sector of a memory module.

In this example, each data element 200 is encrypted using a private key encryption scheme by the data encryption module 130. The data encryption module 130 may run a key generation algorithm for private-key encryption to compute a private key s. The data encryption module 130 may encrypt each data element 200 with the private key s to obtain encrypted data elements 202, which have the values C1-C7, respectively. Alternatively, this encryption may be a public-key encryption. The client 102 may also generate a mapping to re-arrange the data elements 200, which may be performed by the data mapping module 132. In one embodiment, the mapping may be a random permutation, a pseudo-random permutation, or a pseudo-random function. Alternatively, the re-arrangement may be performed using a hash table or a Bloom filter. The hash function associated with the pseudo-random hashing or Bloom filter may be at least one of a plurality of pseudo-random functions. The hash table may use any one of a number of well-known collision resolution methods, as long as the collision resolution method used does not reveal the number of collisions, except with negligible probability (such as by way of always accessing the same number of elements independent of the number of collisions). In this example, the mapping is a random permutation $\pi$ on seven elements, such as (1→6; 2→1; 3→7; 4→5; 5→6; 6→4; 7→2), and the data mapping module 132 re-arranges the encrypted data elements 202 according to the permutation $\pi$ to obtain the encrypted, re-arranged data elements 204. Each of the data elements 204A-204G is associated with a corresponding index 205A-205G, respectively, where the indices 205 are obtained from the indices 201 based on the permutation $\pi$. The client 102 then sends the array of encrypted, re-arranged data elements 204 to the server 104. The client keeps the mapping (permutation $\pi$, in this example), and the encryption key (private key s, in this example).

In this example, the encryption of data elements 200 is followed by the mapping of encrypted data elements 202. Alternatively, the mapping may be performed first, followed by the encryption, such as if the mapping is a permutation.

In another embodiment, the mapping may be applied to more complicated data structures than illustrated in FIG. 2. For example, array data structures similar to the structure illustrated in FIG. 2 (that is one of the illustrative examples of embodiments of this invention) can be used in the manner described above to serve as a building block of more complex data structures. In this way, the access pattern into the more complex data structure may be hidden. As another example, data structures can be implemented that support efficient search methods, such as those present in relational databases and supporting search queries, such as OR, AND, and NOT queries.

Figure 3:
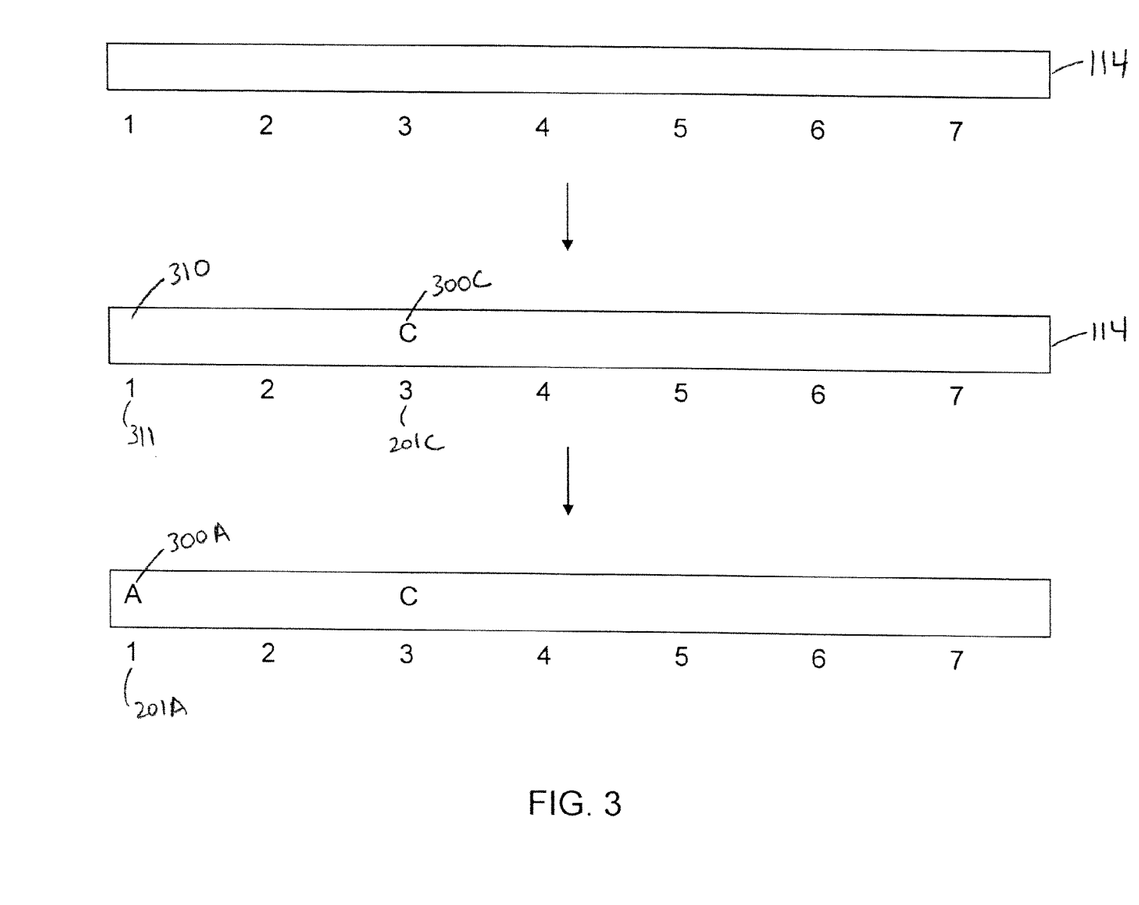
FIG. 3 illustrates operations associated with requesting and storing data elements in a cache memory, in accordance with embodiments of the present invention.

FIG. 3 illustrates operations associated with requesting and storing data elements in the cache memory 114, in accordance with embodiments of the present invention. The client 102 stores data elements received from the server 104 in the cache 114. When the client 102 wants to retrieve a data element with index i (in this example, say i=3, where i in this illustrative example can be between 1 and 7 inclusive), it first checks if the data element with index i is already in its own cache. In this example, the cache management module 136 first checks the cache 114 for the data element 200C (with corresponding index 201C with value i=3) shown in FIG. 2. Initially, the cache 114 is empty, so the data element 200C is not found. The client 102 may then determine which encrypted and re-arranged data element to request from the server 104. The data mapping module 122 may apply the mapping (permutation $\pi$, in this example) to the index 201C (i=3, in this example) to obtain the server memory index 205G with value $\pi(3)=7$, which in this example corresponds to the encrypted and re-arranged data element 204G shown in FIG. 2. The data request module 136 then requests the data element 204G (with value C3, in this example) based on the server memory index 205G. Upon the client 102 receiving the data element 204G stored at the server memory index 205G, the data encryption module 130 decrypts the data element 204G to obtain data element 200C (with value C, in this example). The cache management module 136 then stores a local copy 300C of the data element 200C (either modified or unmodified) in the cache 114 at the position corresponding to the index 201C.

In this example, suppose that the client 102 wishes to retrieve index i=3 one more time, after storing the local copy 300C of the data element 200C in the cache 114. The cache management module 136 again checks the cache 114 for the data element 200C (which has index i=3) shown in FIG. 2. This time, the data element 200C is identified in the cache 114. The client 102 can therefore operate on its local copy 300C of the data element 200C. For example, the client 102 can modify the local copy 300C of the data element 200C. However, to hide the access of data elements by the client 102, the client 102 may access a data element that the client 102 has not yet stored in the cache 114. In this example, the cache management module 136 identifies an unused location 310 in the cache 114 with corresponding index 311 (i=1). As previously described, the data mapping module 122 may apply the mapping (permutation $\pi$, in this example) to the index 311 to obtain the server memory index 205C (with value $\pi(1)=3$).

After decryption by the data encryption module 130, the cache management module 136 stores a local copy 300A of the data element 200A in the cache 114 at the position corresponding to the index 201A.

In addition, the client 102 can access memory at regular time intervals to hide the time and frequency at which the client 102 accesses data. For example, the client 102 can wait until the expiration of a time interval to access data elements stored at the server 104. The time interval may be fixed, random, or pseudo-random.

As described previously, embodiments of the invention replace the client data stored at the server 104 sufficiently often so that each data element accessed by a client, or by a server on behalf of a client, is accessed no more than once in between re-arrangements and re-encryptions. This replacement may occur after a predetermined, fixed number of read/write operations. For example, this predetermined number of read/write operations may be equal to the size of the cache 114, which may potentially make the cache 114 full. Alternatively, this replacement may occur before the cache 114 is potentially full, such as during off-peak times (such as at night), or at predetermined times (such as at night, or every hour, etc.) In one embodiment, if the replacement occurs before the cache 114 is potentially full or if the cache 114 has fewer data elements than the client 102 has backed up on the server 104 (in the example of FIGS. 2 and 3, fewer than seven elements), the client 102 may download all remaining data items backed up from the client 102 on the server 104 at once.

In one embodiment, the replacement follows the same approach as that described in FIG. 2 for encrypting and re-arranging client data, except that a new encryption key and a new mapping are used to generate the replacement client data, where "new" means that the encryption key and the new mapping have not been previously used by the client 102 to process client data. In one embodiment, the key and the mapping can be varied so that the replacement client data stored on the server 104 appears randomly shuffled relative to the client data previously stored on the one or more servers 104. A set of distinct predetermined keys that have not yet been used by the client 102 to process client data may be stored remotely from the client 102. Alternatively, the data encryption module 130 may run a key generation algorithm for private-key encryption to compute the new key. A set of keys that have already been used by the client 102 to process client data may be stored locally by the client 102, such as in the cache 114. Alternatively, the set of keys that have already been used by the client 102 to process client data may be stored in another encrypted and re-arranged data structure on the server 104, as long as the keys are properly encrypted and authenticated.

Figure 4:
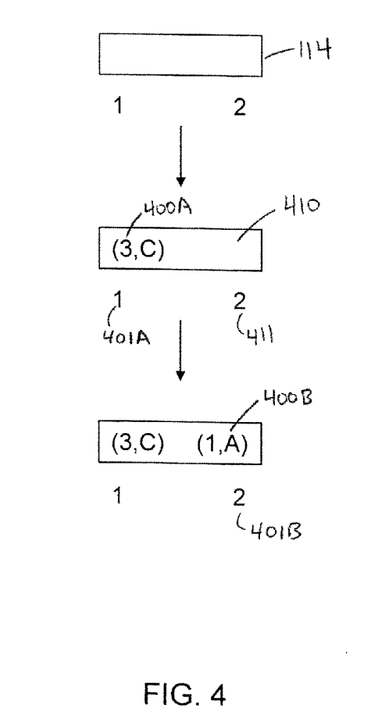
FIG. 4 illustrates operations associated with requesting storing data elements in a cache memory, in accordance with additional embodiments of the present invention.
Figure 5:
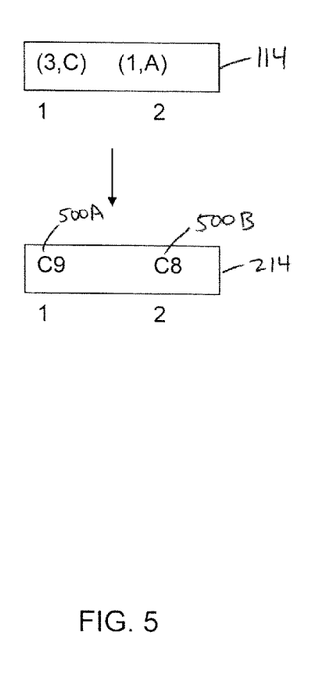
FIG. 5 illustrates operations associated with encrypting and re-arranging data elements, in accordance with additional embodiments of the present invention.

FIG. 4 illustrates operations associated with requesting storing data elements in the cache memory 114, in accordance with additional embodiments of the present invention. FIG. 5 illustrates operations associated with encrypting and re-arranging data elements, in accordance with these additional embodiments of the present invention. These additional embodiments correspond to the case when the cache 114 has fewer data elements than the client 102 has backed up on the server 104. For the example of FIGS. 4 and 5, the data backed up on the server 104 corresponds to the data elements 204A-204G illustrated in FIG. 2. As previously described in FIG. 3, each encrypted and re-arranged data element 204 requested by the data request module 134 is decrypted and unmapped to obtain the corresponding data element 200.

In this embodiment, as described in FIGS. 2 and 3, initially, the cache 114 is empty, so the data element 200C is not found.

After the data mapping module 122 applies the mapping (permutation $\pi$, in this example) to the index 201C, the data request module then requests the data element 204G (with value C3, in this example) based on the server memory index 205G. The data encryption module 130 decrypts the data element 204G to obtain data element 200C (with value C, in this example). As illustrated in FIG. 4, the cache management module 136 then stores a local copy 400A of the data element 200C along with the index 201C (represented as (3, C)) in the cache 114. The indexing method that decides where in the cache 114 to put data elements and the collision resolution method can be arbitrary, as long as a fixed number of locations is read to retrieve any data element. In this example, the index 201C with value 3 maps to index 401A, with value 1.

Then, the data element 200C is identified in the cache 114 by identifying a data element in the cache 114 that begins with the data index 201C corresponding to the data element 200C (the value (3, *) stored in location 1 in the cache 114). The client 102 can therefore operate on its local copy 400A of the data element 200C along with the index 201C. In one embodiment, the data validation module 138 can validate the data element 200C stored in the local copy 400A (value of C) by checking that the index stored in the local copy 400A is the corresponding index 201C (value of 3). As previously described to make the pattern of access of data elements by the client 102 appear hidden to the server 104, the client 102 may also access a data element that the client 102 has not yet stored in the cache 114. In this example, the cache management module 136 identifies in a pseudo-random manner an unused location 410 in the cache 114 with corresponding index 411 (value of 2). In this example, the index 201 that maps to this corresponding index 411 has a value of 1. As previously described, the data mapping module 122 may apply the mapping (permutation $\pi$, in this example) to the index 201 that maps to the corresponding index 411 to obtain the server memory index 205C (with value $\pi(1)=3$). After decryption by the data encryption module 130, the cache management module 136 stores a local copy 400B of the data element 200A along with the index 201A (represented as (1, A)) in the cache 114. In this example, the index 201A with value 1 maps to index 401B, with value 2.

In one embodiment, when the cache 114 fills up (with two elements (3, C) and (1, A) as shown in FIG. 5), the contents of the cache 114 can be treated as or converted to a new array of data elements having key-value array format that are to be stored separately at the server 104 using re-encryption and permuting as explained above. After this is done, there are now two caches, the cache 114 at the client 102 and the new remote cache 214 at the server 104. The remote cache 214 includes data element 500B (represented as C8), where the data element 500B is obtained by encrypting the local copy 400A (represented as (3, C)) with the private key s described previously in the discussion of FIG. 2. Similarly, the remote cache 214 includes data element 500A (represented as C9), where the data element 500A is obtained by encrypting the local copy 400B (represented as (1, A)) with the private key s. The re-arrangement of the elements of the remote cache 214 relative to the elements of the cache 114 is based on a new random permutation on two elements, which in this example is (1→2; 2→0).

In this embodiment, to retrieve data elements from the cache 114 and the remote cache 214 in FIG. 5, the cache management module 136 does as follows. First, the cache management module 136 looks up a data element in the local cache 114. If the data element is found in the local cache 114, the data request module 134 requests a new data element not previously retrieved from the data elements 204 (in this example, the seven encrypted and re-arranged data elements backed up on the server 104 and illustrated in FIG. 2) and also not previously retrieved from the remote cache 214. If the data element is not found in the local cache 114, the cache management module 136 may compute locations in the remote cache 214 where the data element along with its corresponding index (address) could potentially be located, such as by using a pseudo-random function for hash table indexing. If the index corresponding to the data element has already been retrieved from the remote cache 214, then a data element is randomly selected for retrieval from the remote cache 214. If the index corresponding to the data element is not found in the remote cache, then the data request module 134 requests the data element from the data elements 204.

In this embodiment, if the index corresponding to the data element has been found in either the local cache 114 or the remote cache 214, the data encryption module 130 may decrypt the data element. The data validation module 138 may validate the data element by checking that the index stored with the data element is the original index corresponding to the data element (such as original index 201 corresponding to data element 200).

The embodiment just described is an example of the use of multiple caches, with the local cache 114 at the client 102 and the remote cache 214 at the server 104. The process described above for this embodiment can be repeated several times, with different cache sizes. The client 102 can consolidate the remote cache 214 and the local cache 114 into a new, larger cache. In this embodiment, the client 102 downloads, re-encrypts, and re-arranges each data cache and reassembles all elements in the new, larger cache, then stores the new, larger cache on the remote server 104 again in a similar fashion to that previously described. For example, the cache sizes after consolidation can be powers of two, i.e. caches of sizes 2, 4, 8, etc., where each size is twice as big as the previous one.

For the single-server embodiment with a small local cache size described in FIGS. 4 and 5, it is important to note that for each cache, the invariant maintained is that every data element stored in the cache is retrieved at most once from the same location before the cache is re-encrypted and re-arranged. To the server 104, each retrieval by the client 102 from a cache is of a data element that has not been retrieved before from the cache. Also, to the server 104, each cache is downloaded, completely re-encrypted, and completely re-arranged by the client 102, then stored back on the server 104. These are similar principles to those applied to the basic single-server embodiment described in FIGS. 2 and 3. In this case, these principles are applied to multiple caches at the server 104.

Figure 6:
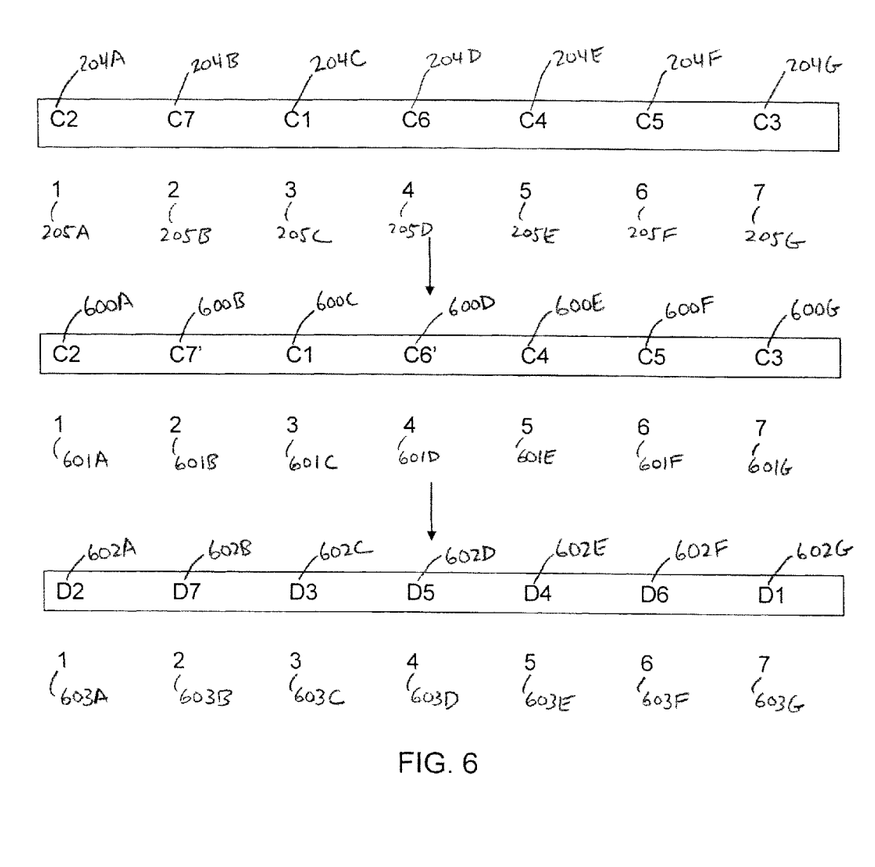
FIG. 6 illustrates operations associated with encrypting and re-arranging data elements, in accordance with further embodiments of the present invention.

FIG. 6 illustrates operations associated with encrypting and re-arranging data elements, in accordance with further embodiments of the present invention. These further embodiments allow one or more clients 102 to interface with multiple servers 104. An assumption is that the multiple servers 104 are not allowed to exchange information with each other beyond what is specified below.

Encrypted and re-arranged data elements 204A-204G and corresponding indices 205A-205G (described in FIGS. 2 and 3) are illustrated in FIG. 6. Assume that the cache 114 of the client 102 is small and contains, for example, only two data elements. In this example, the data request module 134 has read data elements 204B and 204D from the server 104A with corresponding indices 205B and 205D, so that the elements of the cache 114 are (2, C7) and (4, C6). Now the cache 114 is full. In this embodiment there is a second server 104B. The client may re-write the elements of the cache 114 with new encrypted values (2, C7') and (4, C6'), where C7 and C6 are encrypted with a key different from the previously described private key s to obtain C7' and C6', respectively. The client 102 also picks a random new e-shuffling, for example, a permutation that re-arranges the locations of (2, C7') and (4, C6'), The client 102 then provides the new re-encrypted and re-arranged values (2, C7') and 4, C6') to the server 104.

In one embodiment, there are two servers 104A and 104B. Say server 104A has data elements 600A-600G at corresponding indices 601A-601G. The data elements may already be encrypted and re-shuffled data elements stored by the client 102 at the server 104A. The server 104A then selects a new mapping, such as a new random permutation π' on seven elements (1→7; 2→1; 3→3; 4→5; 5→4; 6→6; 7→2) and a new key s'. The server 104A generates the data elements 602A-602G at corresponding indices 603A-603G by encrypting and re-arranging the data elements 600A-600G based on s' and π'. The server 104A then sends s' and π' to the client 102, and sends the data elements 602A-602G to the server 104B.

The client 102 can now erase its cache 114 and request data elements from the serve 104B. If, for example, the client 102 identifies a data element as being present in the cache 114, the client 102 accesses a random location from the server 104B that has not been accessed before, where the random location is at a corresponding index 201. In this example, the client 102 first applies the permutation π, then the permutation π', to obtain the index 603 to be retrieved from the server 104B. The client 102 first decrypts the data element 602 with the key s', then the key s, to obtain the data element 200.

Since the serve 104B does not have access to the key s' and the mapping π', and since the server 104A does not communicate with the server 104B beyond what has been previously described in the discussion of FIG. 6, the client 102 can now retrieve from the server 104B a data element that the client 102 already retrieved from the serve 104A, without either server being aware that the same or a different data element was retrieved from both servers. This approach can be repeated with caches of different sizes moving data back and forth between the servers 104A and 104B. The size of the caches may be powers of 2, i.e. caches of sizes 2, 4, 8, etc., where each size is twice as big as the previous one, and where the caches alternate between the server 104A and the server 104B. In another example, cache sizes can grow as a power logarithmic in total memory size, for example, $O(\log n)$, $O((\log n)^2)$, $O((\log n)^3)$, $O((\log n)^4)$, ... $O(n)$. The innovation is that the server 104A can keep all of the keys and mappings that are used to index the caches of the server 104B, and the server 104B can keep all of the keys and mappings that are used to index the caches of the server 104A. Thus, instead of using sorting networks, the servers 104A and 104B can re-index and sort data based on each server knowing the keys and mappings of the caches of the other server, but not the keys and mappings of its own caches. As a result, a benefit of the two server solution is that each of the servers 104A and 104B can locally sort the data that needs to go to the next cache (on the other server) according to, for example, the new pseudo-random permutation of the next cache, and can provide the description of the pseudo-random permutation to the client 102. In this example, the benefit is that the client 102 does not have to download data before the data has been re-shuffled from the server 104A to the server 104B, or from the server 104B back to the server 104A.

Since each of the servers 104A and 104B does not know the keys and mappings of its own caches, this approach can utilize indirect addressing using previous keys. This may lead to a logarithmic number of indirect addresses that can be computed by the client 102. This is done as follows. For the smallest cache, assume that memory addresses are mapped to pseudo-random keys for the next cache. Now, since the server 104A (that hosts the next cache) knows the key and mapping for the server 104B, it can simply map pseudo-random keys that it currently has to new pseudo-random keys computed according to the key and mapping for the server 104B. The client 102 (which has all the keys) can compute all of the indirections.

In this embodiment, instead of using just two servers, each cache may be placed on a separate server 104.

As described previously in the discussion related to FIGS. 2 and 3, the key and mapping associated with each cache should evolve with time so that the data access pattern of the client 102 is hidden. This is a similar principle to that applied to the basic single-server embodiment described in FIGS. 2 and 3. In this case, this principle can be applied to multiple caches spread across multiple servers 104.

An embodiment of the invention relates to a computer storage product with a computer-readable medium having computer code thereon for performing various computer-implemented operations. The term "computer-readable medium" is used herein to include any medium that is capable of storing or encoding a sequence of instructions or computer codes for performing the operations described herein. The media and computer code may be those specially designed and constructed for the purposes of the invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs"), and ROM and RAM devices. Examples of computer code include machine code, such as produced by a compiler, and files containing higher-level code that are executed by a computer using an interpreter or a compiler. For example, an embodiment of the invention may be implemented using Java, C++, or other object-oriented programming language and development tools. Additional examples of computer code include encrypted code and compressed code. Moreover, an embodiment of the invention may be downloaded as a computer program product, which may be transferred from a remote computer (e.g., a server computer) to a requesting computer (e.g., a client computer or a different server computer) via a transmission channel. Another embodiment of the invention may be implemented in hardwired circuitry in place of, or in combination with, machine-executable software instructions.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit and scope of the invention. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A non-transitory computer readable storage medium comprising executable instructions to:
   process a first plurality of data elements such that the first plurality of data elements are encrypted based on a first key and re-arranged based on a first mapping to obtain a second plurality of data elements, wherein a first data element included in the first plurality of data elements is encrypted based on the first key to obtain a second data element included in the second plurality of data elements, and wherein the first data element is associated with a first index corresponding to a location in a first memory;
   request to store the second plurality of data elements in a second memory at locations determined based on the first mapping, wherein the second data element is associated with a second index corresponding to a location in a second memory, wherein the second index is obtained from the first index based on the first mapping;
   determine whether the first data element is stored in the first memory;
   in response to determining that the first data element is not stored in the first memory:
      request the second data element from the second memory based on the second index;
      decrypt the second data element to obtain the first data element based on the first key; and
      store the first data element at the location in the first memory; and
   in response to determining that the first data element is stored in the first memory:
      retrieve the first data element from the first memory; and
      request a third data element from the second memory that has not been previously requested, without requesting the second data element from the second memory.

2. The computer readable storage medium of claim 1, further comprising executable instructions to, in response to determining that the first data element is stored in the first memory:
   determine whether the first memory includes an unused location;
   upon determining that the first memory includes the unused location, identify a third index corresponding to the unused location, wherein a fourth index is obtained from the third index based on the first mapping; and
   request the third data element stored in the second memory based on the fourth index.

3. The computer readable storage medium of claim 2, further comprising executable instructions to, in response to determining that the first data element is stored in the first memory:
   decrypt the third data element to obtain a fourth data element; and
   store the fourth data element in the first memory at the unused location.

4. The computer readable storage medium of claim 2, further comprising executable instructions to, in response to determining that the first data element is stored in the first memory:
   store the third data element in the first memory at the unused location.

5. The computer readable storage medium of claim 1, further comprising executable instructions to, prior to accessing any of the second plurality of data elements more than once:
- process the first plurality of data elements such that the first plurality of data elements are encrypted based on a second key and re-arranged based on a second mapping to obtain a third plurality of data elements; and
- request to replace the second plurality of data elements by storing the third plurality of data elements in the second memory at locations determined based on the second mapping.

6. The computer readable storage medium of claim 5, wherein the executable instructions to process the first plurality of data elements such that the first plurality of data elements are encrypted based on the second key and the executable instructions to request to replace the second plurality of data elements are executed upon determining that a predetermined number of read/write operations has occurred.

7. The computer readable storage medium of claim 1, wherein the first mapping is defined by at least one of a random permutation, a pseudo-random permutation, and a hash function.

8. The computer readable storage medium of claim 1, further comprising executable instructions to:
- process a first subset of the first plurality of data elements such that data elements based on the first subset are encrypted based on the first key and re-arranged based on a second mapping to obtain a third plurality of data elements stored in a third memory, wherein:
  - the first data element is included in the first subset;
  - a third data element based on the first data element is encrypted based on the first key to obtain a fourth data element included in the third plurality of data elements; and
  - the fourth data element is associated with a third index corresponding to a location in the third memory; and
- request to store the third plurality of data elements in a fourth memory at locations based on the second mapping, wherein the third data element is associated with a fourth index corresponding to a location in a fourth memory, wherein the fourth index is obtained from the third index based on the second mapping.

9. The computer readable storage medium of claim 1, wherein data elements are transferred between at least two servers at regular time intervals, wherein the data elements are re-encrypted and re-arranged prior to each transfer between the at least two servers.

10. The computer readable storage medium of claim 8, further comprising executable instructions to, in response to determining that the first data element is not stored in the first memory:
- request the fourth data element from the fourth memory based on the fourth index;
- decrypt the fourth data element to obtain the third data element;
- obtain the first data element from the third data element;
- validate the first data element; and
- store the first data element at the location in the first memory.

11. The computer readable storage medium of claim 10, wherein the executable instructions to validate the first data element include executable instructions to determine that the third data element includes data corresponding to the first index.

12. The computer readable storage medium of claim 11, wherein the second mapping is defined by at least one of a random permutation, a pseudo-random permutation, a pseudo-random function, and a Bloom filter with pseudo-random hashing.

* * * * *